(12) United States Patent
Belogolovy et al.

(10) Patent No.: US 10,958,587 B2
(45) Date of Patent: Mar. 23, 2021

(54) TRANSMISSION LATENCY REDUCTION

(71) Applicant: Intel Corporation, Santa Clara, CA (US)

(72) Inventors: Andrey Belogolovy, Hillsboro, OR (US); Jeffrey Boyd, Hillsboro, OR (US); Hao Ruan, Shanghai (CN); Longcheng Zhu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 16/370,475

(22) Filed: Mar. 29, 2019

(65) Prior Publication Data
US 2020/0036644 A1   Jan. 30, 2020

Related U.S. Application Data

(63) Continuation of application No. PCT/CN2018/096834, filed on Jul. 24, 2018.

(51) Int. Cl.
*H04L 12/811* (2013.01)
*H04L 12/953* (2013.01)
(Continued)

(52) U.S. Cl.
CPC .......... *H04L 47/263* (2013.01); *H04L 1/0041* (2013.01); *H04L 1/0057* (2013.01);
(Continued)

(58) Field of Classification Search
None
See application file for complete search history.

(56) References Cited

U.S. PATENT DOCUMENTS

| 2011/0161777 A1* | 6/2011 | Radulescu | H04L 1/0061 |
| | | | 714/758 |
| 2012/0195259 A1* | 8/2012 | Ohayon | H04N 21/2187 |
| | | | 370/328 |

(Continued)

OTHER PUBLICATIONS

"Qualcomm Products", https: www.qualcomm.com products, (Accessed on Jun. 10, 2019), 5 pgs.

(Continued)

*Primary Examiner* — Scott M Sciacca
(74) *Attorney, Agent, or Firm* — Schwegman Lundberg & Woessner, P.A.

(57) ABSTRACT

Systems and methods of reducing transmission time are described. Uniform-sized original packets are generated from a data frame having a payload with an identifier and data. The packets include the identifier, total block number, block index that specifies an order of the packet, and the data. The packets are encoded to form redundant packets with the identifier, block number, block index and redundant data. The available block index for the original and redundant packets are different. The packets are transmitted by individual modems over different channels at transmission rates that are each configured to minimize free space in an input buffer of the modem and are dependent on feedback from the receiver. The feedback indicates a difference between the transmission rate and a reception rate. The encoding rate is dependent on the original packets over the original and redundant packets or a maximum transmission rate over the remaining transmission rates.

20 Claims, 14 Drawing Sheets

(51) Int. Cl.
  *H04L 12/891* (2013.01)
  *H04W 28/02* (2009.01)
  *H04L 12/825* (2013.01)
  *H04L 12/801* (2013.01)
  *H04L 12/841* (2013.01)
  *H04L 1/00* (2006.01)
  *H04L 12/835* (2013.01)
  *H04W 4/40* (2018.01)

(52) U.S. Cl.
  CPC .......... *H04L 1/0061* (2013.01); *H04L 47/283* (2013.01); *H04L 47/30* (2013.01); *H04L 47/34* (2013.01); *H04L 47/41* (2013.01); *H04W 4/40* (2018.02)

(56) References Cited

U.S. PATENT DOCUMENTS

2012/0324322 A1* 12/2012 Vedantham ......... G06F 11/1004
  714/807
2015/0229329 A1* 8/2015 Yamada ............. H03M 13/1105
  714/759
2018/0279175 A1* 9/2018 Gholmieh ............... H04W 4/44

OTHER PUBLICATIONS

"SpeedFusion Bonding Technology", https: www.peplink.com technology speedfusion-bonding-technology , (Accessed on Jun. 10, 2019), 5 pgs.

"Max Multi-Cellular Router", https: www.peplink.com products max-cellular-router multi-cellular #hd4, (Accessed on May 10, 2019), 8 pgs.

Byers, John W, "A Digital Fountain Approach to Asynchronous Reliable Multicast", IEEE Journal on Selected Areas in Communications, vol. 20, No. 8, (Oct. 2002), 1528-1540.

Kabatiansky, G, "Chapter 9 Reconciliation of Coding at Different Layers of a Network", Error Correcting Coding and Security for Data Networks: Analysis of the Superchannel Concept, (2005), 11 pgs.

* cited by examiner

TRANSMISSION LATENCY REDUCTION

This application is a continuation under 35 U.S.C. 111(a) of International Application No. PCT/CN2018/096834, filed Jul. 24, 2018, which is incorporated herein by reference in its entirety.

TECHNICAL FIELD

Aspects pertain to communications between devices in a radio access network (RAN). Some aspects relate to reduction in latency of communications between devices in a RAN. Some aspects relate to reduction in latency of motor vehicle communications.

BACKGROUND

The use of various types of networks and devices (user equipment (UEs)) using network resources as well as the amount of data and bandwidth being used by various applications has continued to increase. Vehicular network or device-to-device communications, for example, may encompass an increasing amount of data and control information in an effort to provide various functionality. This functionality may include active collision avoidance and self-parking, as well as a host of other functions that may use telemetry and other data from the vehicle. The cost of increasing the amount of data communicated and the increased processing (both in the vehicle and externally), however, may include an increase in communication latency, which may adversely affect the automated functionality.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1:
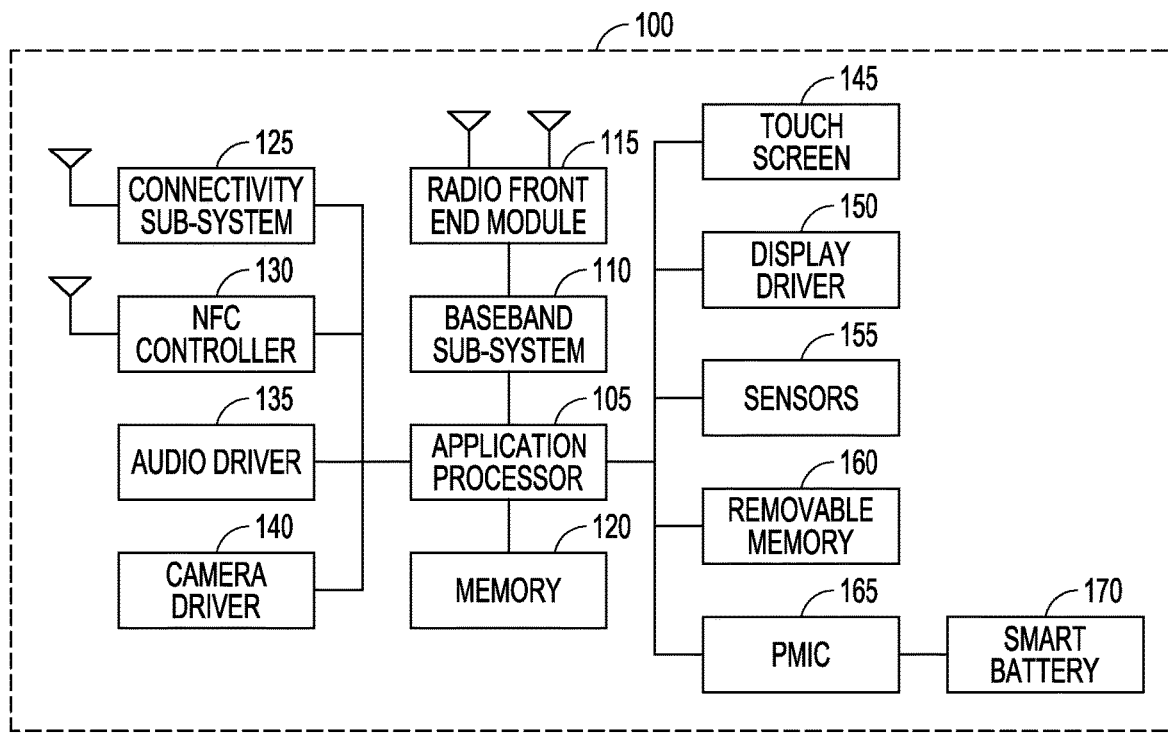
FIG. 1 illustrates a UE in accordance with some aspects.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1 illustrates a UE in accordance with some aspects. The user device 100 may be a mobile device (or a vehicle/vehicle-installed mobile device) in some aspects and includes an application processor 105, baseband processor 110 (also referred to as a baseband sub-system), radio front end module (RFEM) 115, memory 120, connectivity subsystem 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
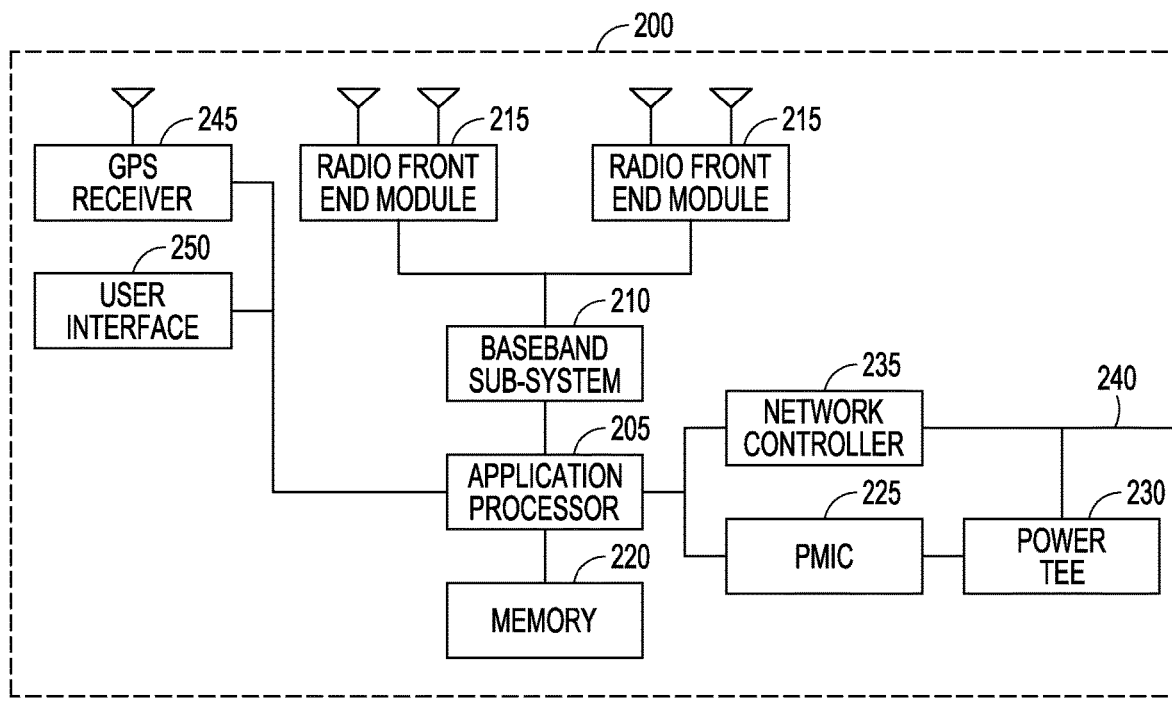
FIG. 2 illustrates a base station or infrastructure equipment radio head in accordance with some aspects.

FIG. 2 illustrates a base station in accordance with some aspects. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, $I^2C$ or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAIVI) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
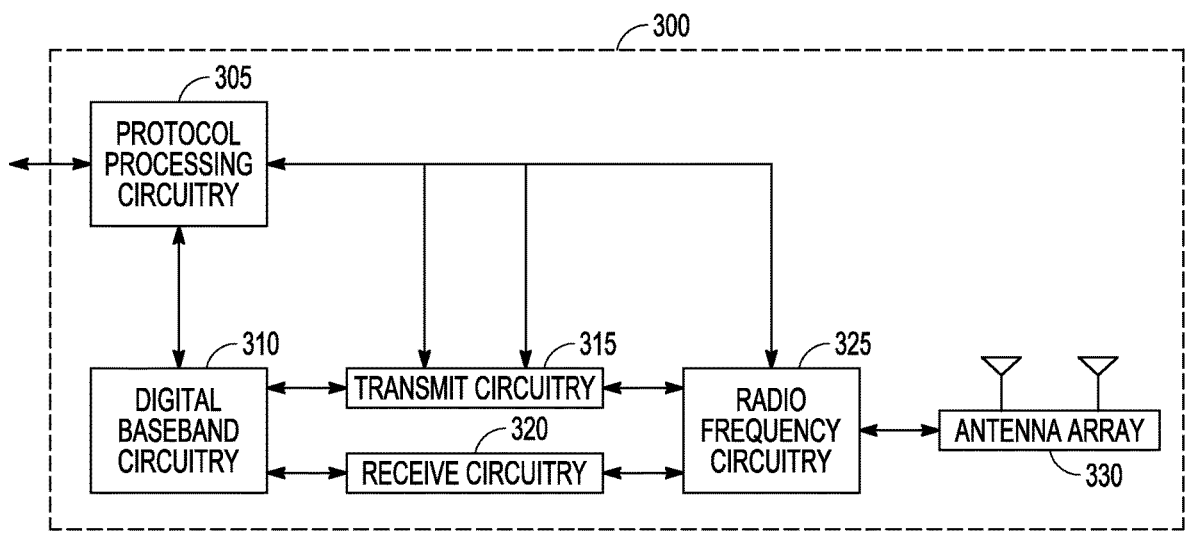
FIG. 3 illustrates millimeter wave communication circuitry in accordance with some aspects.

FIG. 3 illustrates millimeter wave communication circuitry in accordance with some aspects. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect subsystem, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I²C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface subsystem may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
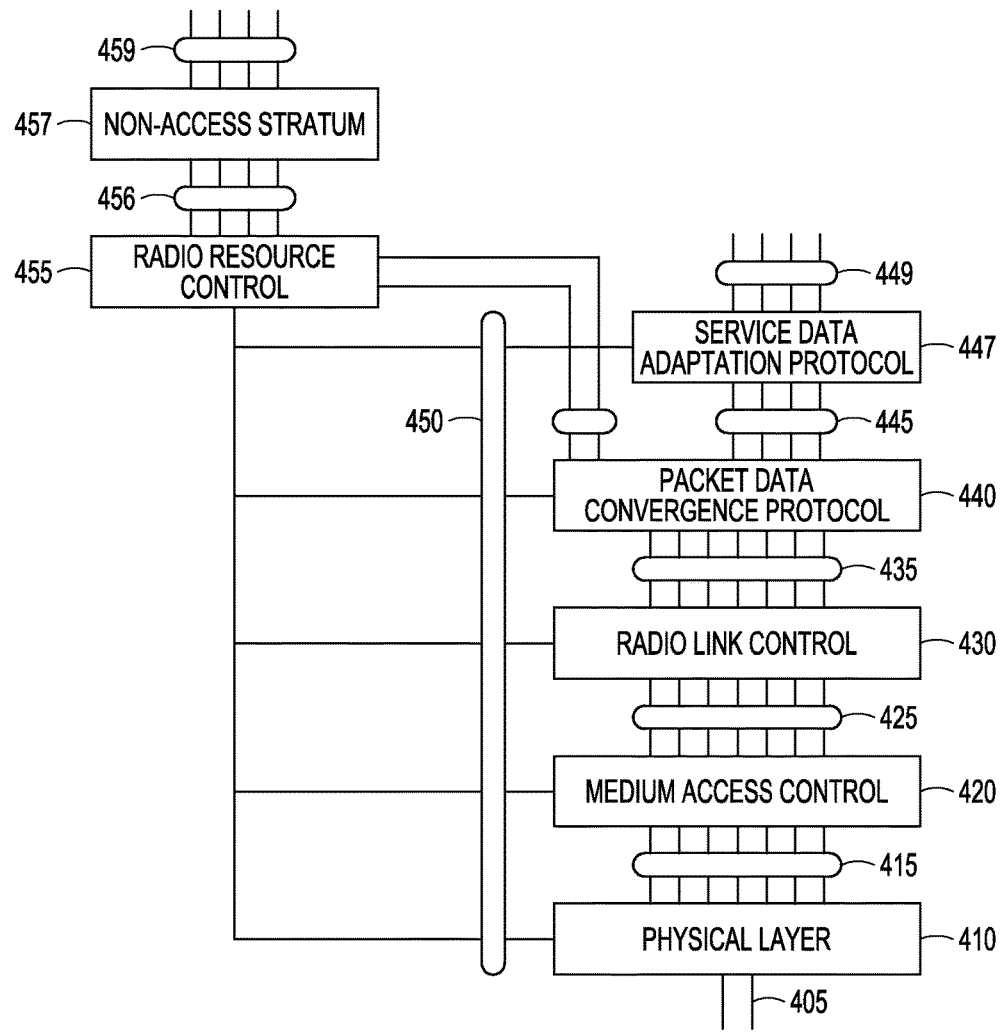
FIG. 4 is an illustration of protocol functions in accordance with some aspects.

FIG. 4 is an illustration of protocol functions in accordance with some aspects. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
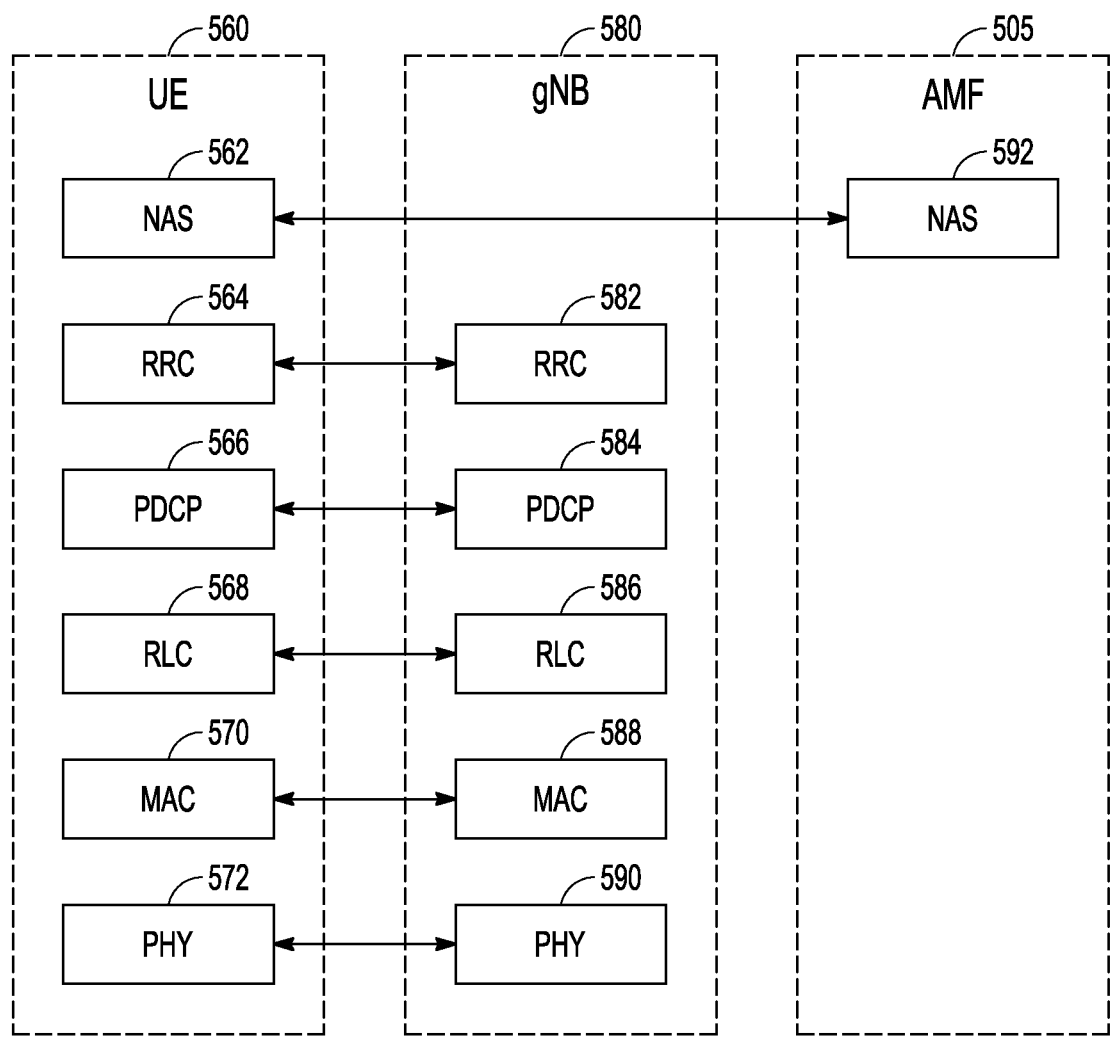
FIG. 5 is an illustration of protocol entities in accordance with some aspects.

FIG. 5 is an illustration of protocol entities in accordance with some aspects. The protocol entities may be implemented in wireless communication devices, including one or more of a user equipment (UE) 560, a base station, which may be termed an Evolved NodeB (eNB) or new radio (NR) NodeB (gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and SGNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1ms in duration. According to some aspects, each subframe may consist of one or more slots. In some aspects, the time intervals may be represented in units of E. According to some aspects, $T_s$ may be defined as $1/(30,720\times1000)$ seconds. According to some aspects, a radio frame may be defined as having duration $30,720.T_s$, and a slot may be defined as having duration $15,360.T_s$. According to some aspects, $T_s$ may be defined as $$T_s=1/(\Delta f_{max}\cdot N_f),$$

where $\Delta f_{max}$–480×10³ and Nf–4,096. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$x^{(0)}(i)=d(i)$ and the layer mapping for two layers may be expressed as:

$x^{(0)}(i)=d(2i)$ $x^{(1)}(i)=d(2i+1)$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$[x^{(0)}(i) \ldots x^{(v-1)}(i)]^T$ where i represents a sequence number index in the range 0 to $M_{symb}^{ap}-1$ the output is represented as a block of vectors:

$[z^{(0)}(i) \ldots z^{(P-1)}(i)]^T$ where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as sk(i), where k is a subcarrier index and i is a symbol number index, a time domain complex baseband symbol x(t) may be represented as:

$$x(t) = \sum_k s_k(i) p_T(t - T_{sym}) \exp[j2\pi f_k(t - T_{sym} - \tau_k)]$$

Where $p_T(t)$ is a prototype filter function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, 1) where k is the index number of subcarrier, in the range 0 to N·M-1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
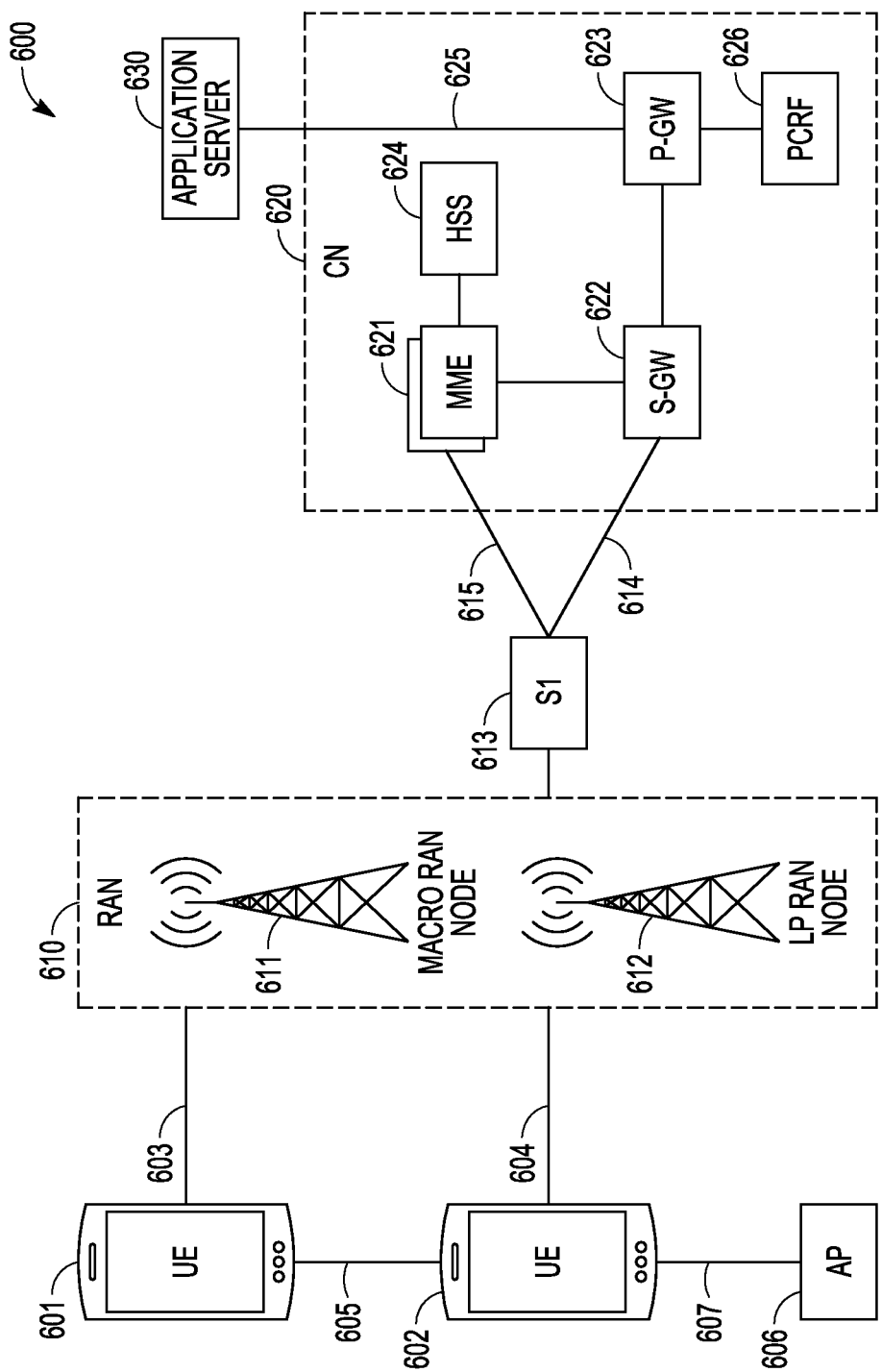
FIG. 6 illustrates an architecture of a system of a network in accordance with some aspects.

FIG. 6 illustrates an architecture of a system of a network in accordance with some aspects. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some aspects, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this aspect, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some aspects, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some aspects, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the aspects is not limited in this respect. The OFDM signals can comprise a plurality of orthogonal subcarriers.

When the UEs 601 and 602 communicate using 3GPP protocols (rather than WiFi protocols), the physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In aspects, the CN 620 may be an evolved packet core (EPC) network, a 5GC network, or some other type of CN. In this aspect, the S1 interface 613 is split into two parts: the S1-U interface 614, which carries traffic data between the RAN nodes 611 and 612 and the serving gateway (S-GW) 622, and the S1-mobility management entity (MIME) interface 615, which is a signaling interface between the RAN nodes 611 and 612 and MMES 621.

In this aspect, the CN 620 comprises the MMES 621, the S-GW 622, the Packet Data Network (PDN) Gateway (P-GW) 623, and a home subscriber server (HSS) 624. The MMES 621 may be similar in function to the control plane of legacy Serving General Packet Radio Service (GPRS) Support Nodes (SGSN). The MMES 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this aspect, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 may be able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some aspects, the instructions may reside on a tangible, non-volatile communication device readable medium, which may include a single medium or multiple media. Furthermore, any portion of the instructions may be transferred to the hardware resources from any combination of the peripheral devices or the databases. Accordingly, the memory of processors, the memory/storage devices, the peripheral devices, and the databases are examples of computer-readable and machine-readable media.

As above, in communication systems, a significant amount of data may be generated by electronic devices. This data may be communicated between devices via a network (e.g., 4G/5G) or directly (e.g., via D2D or D2X communications) in a block of bytes (transmission time interval (TTI)) rather than bit-by-bit. The sizes of the blocks may vary, dependent on, for example, the communication system (e.g., 4G vs 5G) as well as operational transmission parameters. One of the operational transmission parameters is latency, which is the time between transmission of the $1^{st}$ byte in the block being initiated at the transmitter side and the last byte of the block being received at the receiver side.

The overall communication latency may be affected by operations at the different OSI layers. The overall latency may include physical layer latency of the communication systems, media access layer latency and network layer latency. Physical layer latency may be an issue as the device may have its own block sizes, in which case the data block may be repacked. Media access layer latency may occur when the device resolves conflicts, if any, and establishes scheduling to wait for transmission and retransmission opportunities, among others. Network layer latency may occur due to other elements in the network, such as routers, which have their own buffers, schedules, and priority.

Shorter latencies may indicate better signal quality and lower network use, and may generally be better for certain applications. Typical latencies for 4G systems are around 60 ms. In particular, with the advent of NR systems the number of latency-critical applications have increased. Such applications include mission-critical applications that are unable to work or that are incapable of satisfying user desires if the latency exceeds a particular threshold (which may vary between applications).

Vehicular communications (e.g., vehicle-to-everything (V2X) communications) is one example of such a latency-critical application. V2X communications may be part of a next generation Intelligent Transportation System (ITS) that is to be designed to take into account the massive influx of low-data, high-delay and low power transmissions. There may be multiple radio access technologies (RATs) available for communications by V2X devices, such as those in FIGS. 1-6. V2X devices (also called on-board units or OBUs) may be equipped with a range of multiple access technologies for V2X communications, using protocols such as Dedicated Short Range Communication (DSRC), LTE, and 5G, among others, each of which may be direct or network-mediated communication between OBUs. The DSRC suite of protocols is based on the IEEE 802.11 standards, adding modifications to the exchange of safety messages between vehicles and vehicles and road side units (RSUs).

The types of communications in the ITS may include Vehicle-to-Vehicle (V2V) communications (OBU-OBU), Vehicle-to-Infrastructure (V2I) communications (OBU-RSU), Vehicle-to-Network (V2N) communications and Vehicle-to-Pedestrian (V2P) communications. The communications may occur over a PC5 reference point. V2X applications in the V2X devices may communicate with other vehicle-based V2X applications (V2V communications), V2I communications may involve communications with a RSU and V2N communications may involve communications with an eNB (or E-UTRAN) to provide various V2X services. The communications among OBUs may be coordinated by a traffic management server.

ITS applications may rely on the concept of situation or co-operative awareness, which is based on periodic and event-driven broadcast of basic safety messages (BSM) for V2V, V2I and V2P transmissions. Such transmissions may thus be based on primarily broadcast capability between vehicles or between vehicles and vulnerable road users (e.g., pedestrian, cyclist). The transmissions may, for example, provide information about location, velocity and direction, which may be used to avoid accidents. The short messages (BSM) may be useful locally to identify situations that require action (e.g. collision warning, emergency stop, pre-crash warning, etc.) within very short intervals (e.g. 20 to 100 msec). As such, minimizing the overhead involved in enabling scalable transmission and reception of BSMs is one of the challenges to support V2X (V2V, V2I and V2P) over cellular systems. Broadcasts, however, are not the only transmissions between the OBUs; unicast messages may also be communicated between the various OBUs.

V2I transmission may be provided between a vehicle and RSU. V2N transmission may be between a vehicle and a V2X application server. A V2X Application Server may be able to support multiple V2X applications. A RSU may be used to extend the range of a V2X message received from a vehicle by acting as a forwarding node (e.g., repeater). V2I may include communication between vehicles and traffic control devices, such as in the vicinity of road work. V2N may also include communication between vehicle and the server via the 4G/5G network, such as for traffic operations. Thus, an RSU may support V2I service that can transmit to, and receive from, a UE using V2I applications. In various aspects, the RSU may be implemented in an eNB or a stationary UE. The RSU may rebroadcast V2X messages for other vehicles (V2V), pedestrians (V2P), or various networks systems (V2I) using a multimedia broadcast multicast service (MBMS) for LTE.

Figure 7:
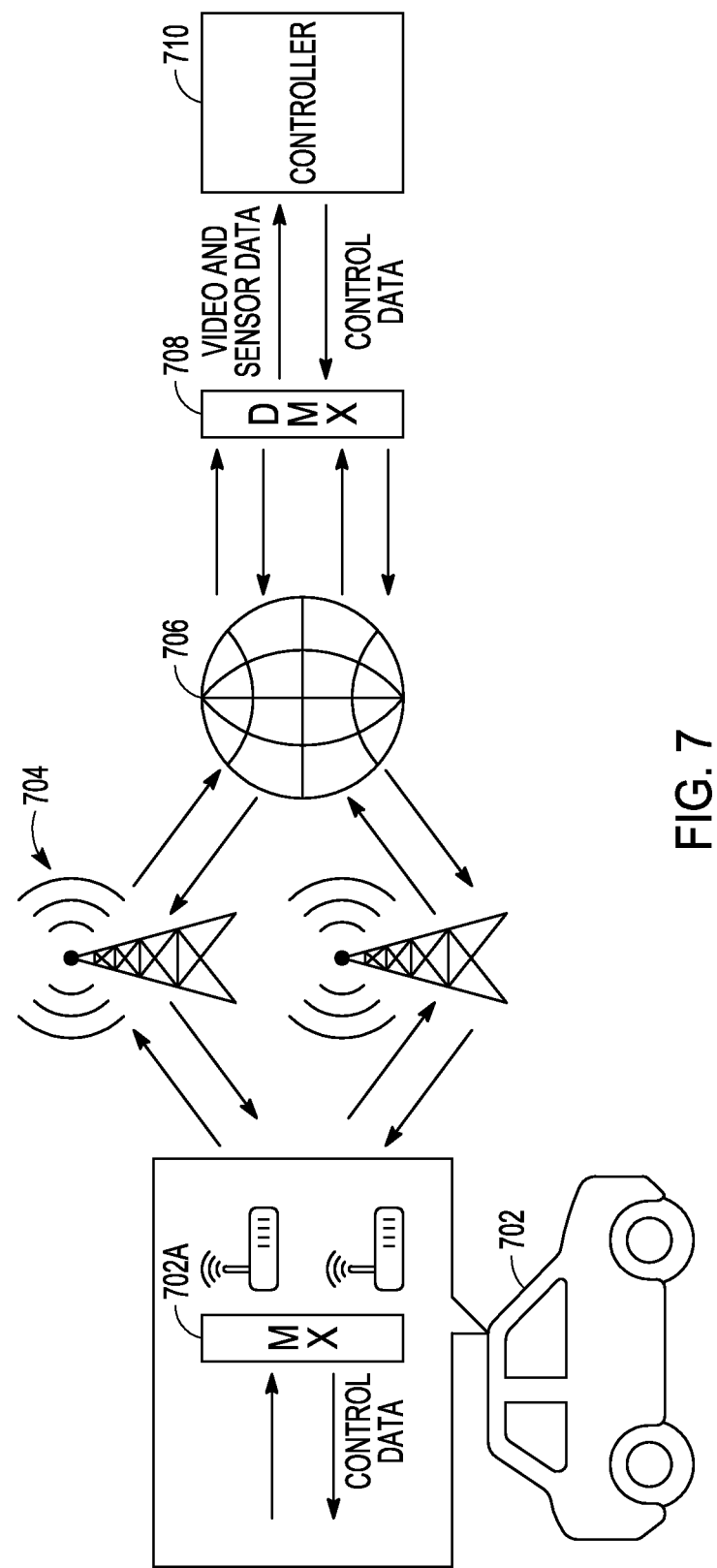
FIG. 7 illustrates remote vehicle operation in accordance with some aspects.

One type of V2X communications includes remote vehicular operation, shown in FIG. 7. FIG. 7 illustrates a vehicle 702 that is remotely controlled by a controller 710, which may be a processor or computer. The controller 710 may be in a stationary location, a mobile device or within another vehicle. The vehicle 702 and the controller 710 may be connected via one or more base stations or other access points 704, which may be connected to the vehicle 702 over the air (OTA), and a network 706 (e.g., 4G/5G), to which the controller 710 is connected. The vehicle 702 may be a piloted vehicle or may be an unpiloted vehicle, such as a drone.

To operate a vehicle 702 remotely, control and sensor and/or video data may be sent from one or more devices in the vehicle 702 to the remote controller 710. The video data may be compressed and encoded at the vehicle 702 prior to transmission, and may be decompressed and decoded at the controller 710 when received. The sensor data may include conditions of the car (e.g., tire pressure, engine temperature, oil pressure, speed) and/or radar/lidar/environmental information (e.g., camera, external temperature, vehicle location, location of nearby vehicles). The control and sensor/video data may be generated and/or transmitted at the same time and multiplexed by a multiplexor 702a in the vehicle 702. The data from the multiplexor 702 may be split to be provided through different access points 704 before being relayed through the network 706. The data may be split such that different data is transmitted to different access points 704 or may be replicated across different paths for reliability. In some cases, only some of the data may be replicated, e.g., control data or data that desires enhanced reliability (e.g., video data).

The data transmitted through the network 706 may be demultiplexed by a demultiplexor (DMX) 708 prior to being supplied to the controller 710. The demultiplexed data streams may correspond to the data streams provided to the multiplexor 702a and may be processed by a processor in the controller 710 or by different processors (each dedicated to a different stream) in the controller 710. The controller 710 may process the received data, determine how to control the vehicle 702, then send control information back to the vehicle 702 in the same manner as the data was sent to the controller 710. The control information may be encrypted and/or replicated for transmission or otherwise protected. The entire operation may be expected to occur in real time, and the roundtrip time (i.e., the time to transmit the data from an event and receive the control information) should not exceed a threshold determined for the event. This threshold may be dependent on timing to accurately control the vehicle and may be, for example, 100 ms. The timing, however, may differ for different events or under different conditions.

In one example, if the vehicle 702 is moving at 20 m/s (=72 km/h), the vehicle 702 travels 2 meters every 100 ms; thus, for example, giving ample time to correct for lane drift (whose lateral motion is much slower than 20 m/s) as well as sufficient time to correct for a sudden stop in traffic. In some aspects, 100 ms may be the maximum limit for RTT (and processing of the control information at both ends). At present, however, if an LTE modem in the vehicle 702 is used to send data back and forth, much higher roundtrip times occur. To emulate remote control of a vehicle, measurements of packet roundtrip times for packets sent to www.google.com and to a remote server in Hillsboro, Oreg. over LTE show roundtrip times almost everywhere exceed a threshold of 100 ms. Moreover, for particular video and command transmission applications, 1 packet may be insufficient for latency measurements because applications generate data with large blocks. For example, 1 compressed video frame of 50 k may take 50 packets (packet data units or PDUs) of 1k, and at the receiver side the decoder may wait to receive all 50 packets before processing is initiated. Assuming (for simplicity) that the roundtrip time has a Gaussian distribution, then simulations of the block transmission latency for 50 packets (the time to get all 50 packets, i.e. the worst latency over 50 transmission) increases from about 110 ms (for a single packet) to about 140 ms, i.e., the more packets to process, the worse the latency becomes.

For 50 packets, for example, the latency as evidenced by a simulated histogram of packet round trip times exceeds the threshold of 100 ms, and thus, based on this timing, remote operation of the vehicle may be undesirable. To overcome this issue, a new communication platform may be used in which multiple LTE modems and other network interfaces are used in parallel, with transport layer coding, and with low-latency processing accelerators. This may permit the vehicle to become a hub of the network.

In particular, in some aspects, instead of using a single LTE modem for communication, additional modems (2, 3, or 4, for example) may be added to work in parallel. All data to be sent may be split (demultiplexed) into short packets. The packets may be distributed across all of the modems within the vehicle for transmission from the vehicle. For example, a first set of packets may be sent to a first of the modems, a second set of packets may be sent to a second of the modems, etc. The modems, in some embodiments may transmit packets using different channels in the same technology or using different technologies. In some aspects, the same number of packets may be sent to each modem, while in other aspects the number of packets may differ from modem to modem depending, for example, on latency of each modem (i.e., how long it takes to transmit a packet, which may, for example, depend on the number of packets buffered in the modem and the network conditions for the channel used by the modem to transmit among others). In some aspects, the packets may be distributed sequentially or randomly among the modems.

To transmit K packets, various types of encoding may be used. In some aspects, for example, erasure-forward error correction (FEC) coding may be used to generate M extra packets and send the extra packets to the network in addition. In this case, at the receiver side, it may be possible to reconstruct the original message using any K of (K+M) packets. This may allow the use of the first K packets, i.e., the K packets that have been received faster than the other packets.

In addition, low-latency oriented processing (e.g., <1-10 ms) may be used everywhere, for example, in video compression. One example of low-latency video compression may be HEVC, H.264, H.263 or H.261. Similarly, a rate control/rate feedback mechanism may be used to limit the amount of data to be sent over the network, with the feedback provided from the remote controller. As the result, buffering of packets at the output of the modems may be minimized or avoided entirely. A scheduling mechanism may be used at the transmitter to distribute packets across multiple modems based on the feedback, thereby avoiding exceeding the rate control-provided limitation to minimize slice reconstruction time at the receiver. A communication platform realizing these 6 principles is shown in FIG. 8.

Figure 8:
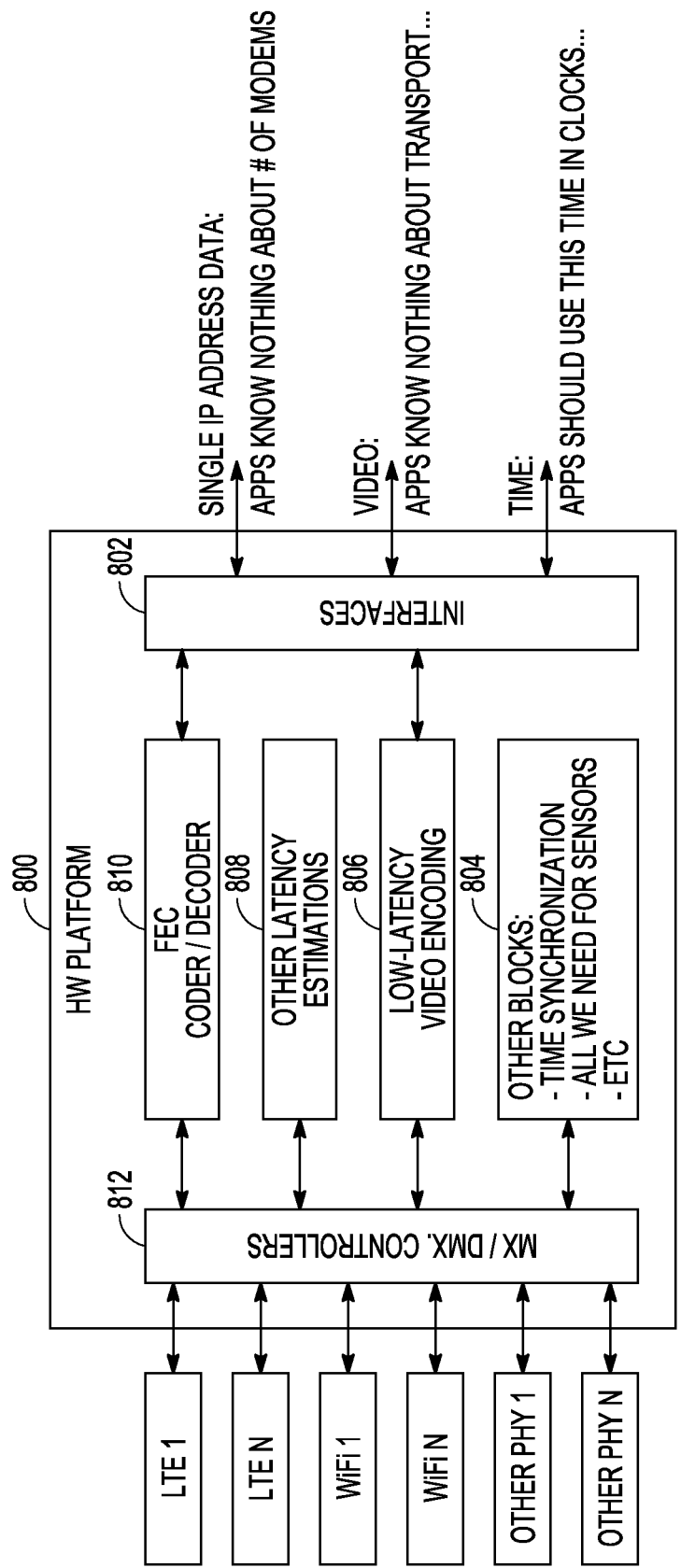
FIG. 8 illustrates a communication platform in accordance with some aspects.

In FIG. 8, the hardware platform 800 may contain multiple components, including interfaces 802 through which internal communications with other elements in the system may occur. The other elements may include sensors, which may be addressed (e.g., polled) by the controller (not shown) using a single IP address. This is to say that data sent to the sensors via different the applications used by the sensors may be addressed to the same IP address, and data sent to the controller may be sent to the IP address of the controller. The use of different modems to send data to/receive data from the controller may be transparent. This may also be true of the camera or video data, for which the transport mechanism (e.g., technology, channel, bandwidth) may be transparent. In addition, in some aspects a system clock may be provided to the platform through the interfaces 802. The system clock may be used as a basic clock for the components in the platform 800, which may be synchronized by the processing blocks 804. The processing blocks 804 may also be used to package and unpackage data for the sensors as well as perform other functions. The hardware platform 800 may contain, as above, a low-latency video encoder 806, an FEC coder/decoder 810, as well as a processor to estimate the latency of the different modems. Multiplexors, demultiplexors and other controllers 812 in the hardware platform 800 may permit the various devices to communicate with the external vehicle controller via different bands (shown as LTE1 .... LTEN, WiFi1 .... WiFiN, and other physical channels (PHY1 .... PHYN)).

In one example, the communication system may have 3 LTE modems and Raspberry Pi as a controller 812. The measured one-way video slice latencies in real time using 5 s time intervals shows an overall constant data goodput of about 1000 KBytes and video sequence latency of about 50 ms. Individual modems vary between about 800 and 1500 KB for data goodput and between about 25 and 100 ms latency for video sequences.

A simulation of roundtrip time performed for coded and uncoded transmissions was performed for a single original packet and 1 original packet and 3 redundant packets, as well as for 5 original packets in a block and the original block and 15 redundant packets. The projected gains of transport layer coding applied over multiple modems operating in parallel were obtained. Assuming that packet roundtrip time of a single packet has a Gaussian distribution with the peak at about 152 ms, then adding 3 redundant packets improved the latency by moving the peak of the Gaussian distribution to 136 ms (gaining 16 ms). For data that does not fit in a single packet (e.g., video data), 5 packets were used. The roundtrip time of the 5 packets became worse (the peak at 168 ms). By adding coding and sending 15 redundant packets (3 sets of 5), the peak moved to 140 ms of the Gaussian distribution, gaining ~28 ms. This amount of reduction in timing may be quite large and helpful to decrease the control time of vehicles, allowing systems to avoid the use of dedicated networks and dedicated radio spectrums (to avoid conflicts) for latency critical applications, such as quadcopter racing (5.8 GHz band).

An application was used to generate data simulating video slices at a given data rate, every 2 ms a new slice was generated and sent. The transmitter and the receiver were synchronized to the same Intel NTP server and the timestamp added to every transmitted slice. A HD4 with Media-Fast Quad LTE Mobile Router from Peplink with 3 SIM cards was used in the modem setup. The Peplink transmitter was placed exactly in the same place in an office where the 3 modem setup was located. A Pipeware balance router supporting SpeedFusion (from Peplink) was used at the receiver side. 30-second tests were performed at different sequence data rates (256, 512 and 1024 megabytes per second) and the instant one way latency measured. Using collected statistics, cumulative distribution function (CDF) plots were prepared for each experiment.

A histogram of the results compared Peplink and the instant system. For a 512 kilobytes per second (kB/s) data rate, about a 60 ms latency improvement was obtained at 90% delivery. For 1024 kilobytes rate, a solution from Peplink was unable to provide realistic latency for comparison, whereas the proposed solution demonstrated a 90% sequence delivery in 60 ms. Note that the term slice is a term of the H.264 (Advanced video coding for generic audiovisual services) standard. Thus, the slice is a part of a video frame that is encoded and decoded independently, i.e. a slice has no data dependencies outside of the slice. A video slice is part of the uncompressed frame, while a compressed slice is part of the video frame after compression.

To reduce the latency, video frames may be split into smaller parts. For example, a frame size=1024×480 may be split into 6 parts=6 video slices. Each slice size=1024×80. These parts of the frame may be compressed independently, generating 6 compressed slices. Each slice may also thereafter be transmitted independently of each other slice.

Figure 9:
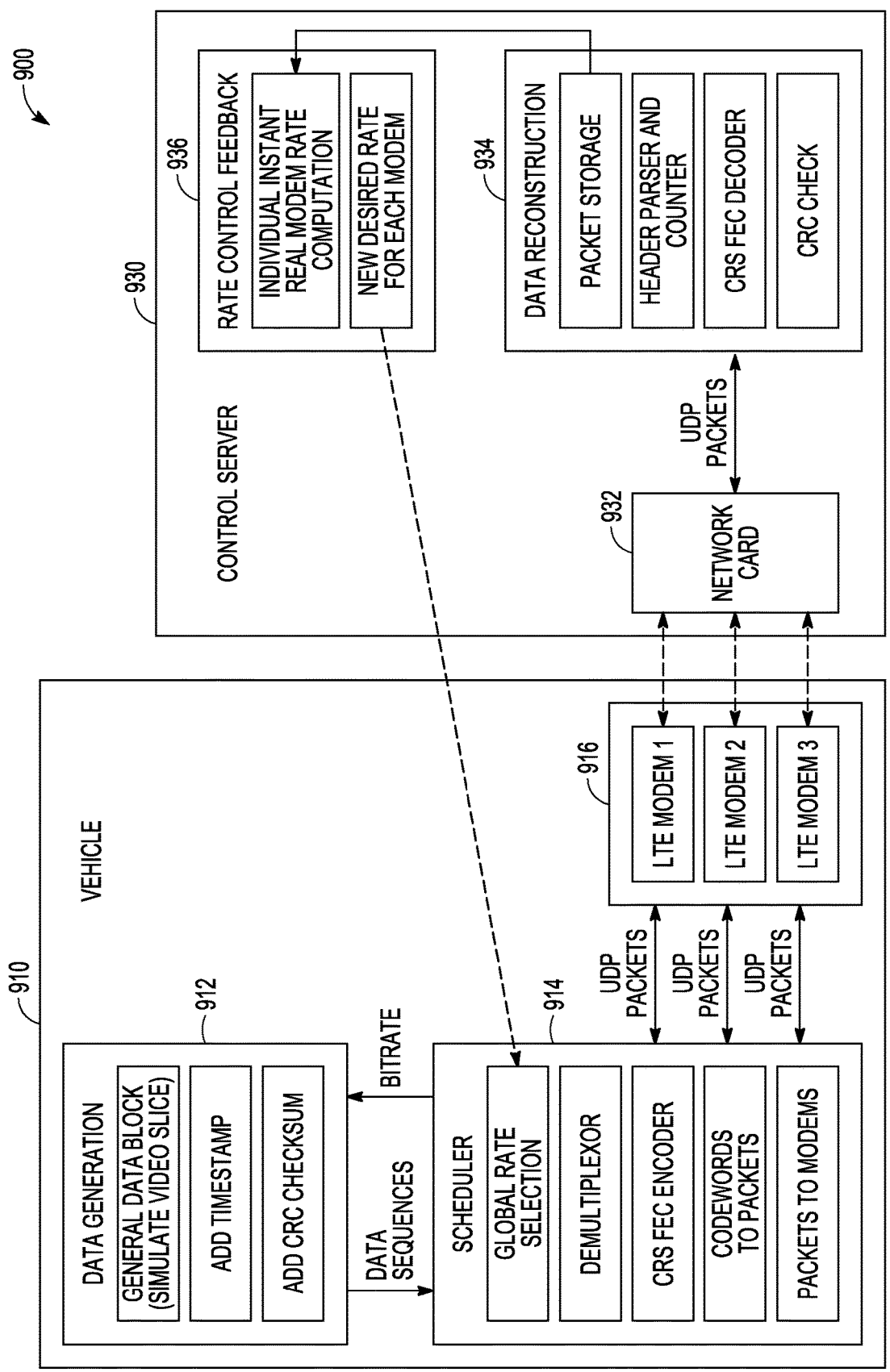
FIG. 9 illustrates a transmission high-level scheme in accordance with some aspects.

The technique used herein may include the transmission and receiver modules. A high level scheme of the communication from the remote vehicle to a server is shown in FIG. 9. The system 900 may include one or more vehicles 910 in communication with one or more control servers 930 (controllers). A generator 912 in the vehicle may generate a data block/video slice. The video slice may be a minimum self sufficient video data block (referred to herein as a data sequence). All bytes of the data sequence may be equally important, and it is desirable to either to deliver the data sequence to the remote module or to drop the entire data sequence. A timestamp and CRC may be added to the sequence before providing the data sequence to a scheduler 914 that schedules data of the data sequence for each modem 916. The data generator 912 may generate the data of the data sequence for transmission by the vehicle 910 based on a bitrate provided by the scheduler 914.

Processing at the transmission side (car or any remote device) may thus include specifying the input data and the scheduling. Before demultiplexing the data sequence, a sufficient amount of data should be accumulated, which may be dependent on the bitrate and desired FEC encoding rate. The video encoder used may generate a compressed slice every given time interval (for example, every 1 ms), but the size of a compressed slice may differ in accordance with a transmission rate from the vehicle 910 as provided from the modems 916. The transmission rate information may be provided to the encoder from the scheduler 914. The input data may form a sequence with a CRC checksum of itself.

The data sequence may be transferred to the modems 916 as data packets. The modems 916 may then transmit the packets to the control server 930, where they are received by a network card 932. The packets arriving at the network card 932 may be transferred to a data reconstructor 934. The data reconstructor 934 may include a memory (packet storage) to retain packets, a header parser and counter to determine the type and number of packets, the FEC decoder and CRC checker to ensure that the packets have not been corrupted. The packet storage of the reconstructor 934 may provide information about how many packets are stored, as well as the associated modem (e.g., based on the channel used to receive the packet or a modem ID inserted into a header of the packet) to a rate control feedback unit 936. The rate control feedback unit 936 (also referred to as a rate controller) may use the storage information to provide an instant real modem rate computation for each individual modem and compute a new desired rate for each modem based on this computation.

In some aspects, the packet storage should essentially be empty. This is to say that if the rate control feedback unit 936 determines that the packet storage unit is not empty, it may determine which modem(s) is associated with a packet transmission that is too rapid for the reconstructor 934 to reconstruct the data sequence. The rate control feedback unit 936 may then determine a reduced rate for the modem(s). Similarly, if the packet storage is empty, the rate control feedback unit 936 may determine one or more of the modems to increase the transmission rate of the packets. Whether the rate control feedback unit 936 determines that the transmission rate of one or more of the modems is to increase or decrease, the modem rate information determined by the rate control feedback unit may then continuously fed back to the global rate selector in the scheduler 914 of the vehicle 910 on a control channel to allow the global rate selector to adjust the supply of packets to the individual modems.

Figure 10:
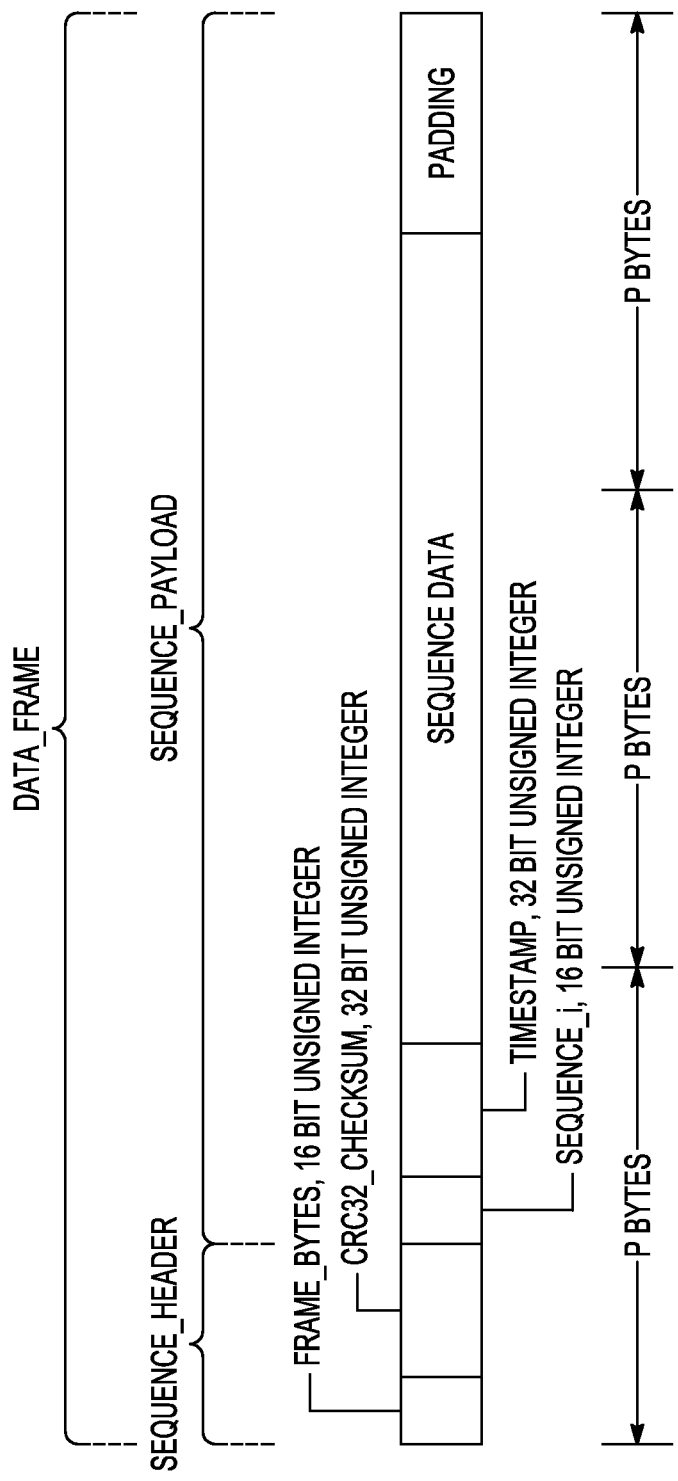
FIG. 10 illustrates a sequence structure in accordance with some aspects.

Turning to the transmission side, the sequence structure used before demultiplexing is shown in FIG. 10. In the sequence structure, frame bytes may be a 16 bit integer that indicates the sum of: the sequence data length, the size of the 16 bit sequence_i and the size of the 32 bit timestamp. The sequence_i is the identifier of a sequence from 1 to S; every time the demultiplexer receives a new data block at the input, the demultiplexer may start a new sequence with number +1. After sequence S, the counter may reset. The 32 bit crc32_checksum may be used to verify sequence correctness when reconstructed at the receiver side. Additionally, the timestamp may be recorded when a sequence is generated, as well as a timestamp at the receiver side when a sequence is reconstructed. This may promote an accurate sequence latency calculation.

In more detail regarding scheduling and transmission, the demultiplexor in the scheduler 914 shown in FIG. 9 may apply different schedule algorithms and follow a predetermined set of rules. These rules may ensure packet size in the desired range, minimize padding of the bytes, etc . . . to split the data sequence into several packets. Padding may be added to one or more of the packets to ensure that each packet has the same length. K packets may result at the output of demultiplexer. The K packets may be original packets and each packet length may have P+8 bytes as headers may be added to identify the sequence, block and remove padding at the receiver.

Figure 11:
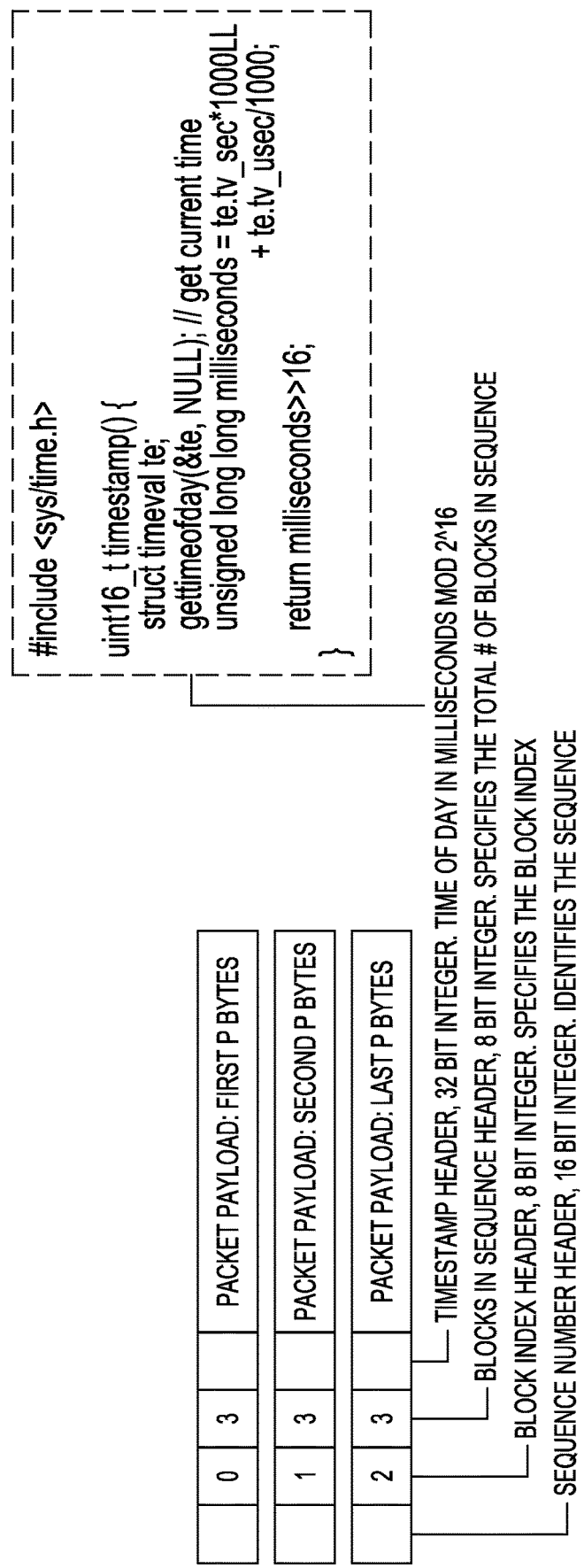
FIG. 11 illustrates a packet structure in accordance with some aspects.

The packet structure after applying the demultiplexor is shown in FIG. 11. As shown, the packet structure may include a 16 bit sequence number header, an 8 bit block index header, an 8 bit blocks-in-sequence header and a 32-bit time stamp header, in addition to the packet payload that includes the data. The sequence number header may be an integer from 1 to a predetermined number (S) to indicate that the data block belongs to a given sequence. Every time the demultiplexer receives a new data block at the input, the demultiplexer may start a new sequence with the sequence number +1. After the predetermined number of sequences (e.g., sequence S), the counter may reset.

The block index header may indicate which packet in a particular sequence identified by the sequence number in the sequence number header current block is carrying. The first original packet may be assigned number 0, the next original packet may be assigned number 1 and so on, up to K-1, which may indicate the end of the sequence. The block number indicated by the block index header may be used by the demultiplexer to provide ordering information when splitting the sequence. The block number may also be used by an encoder to mark redundant packets. If M redundant packets exist after encoding, the packets may be marked from K to K+M-1. The blocks-in-sequence header may indicate a sum of all original packets and redundant packets. If K original packets and M redundant packets are present, the number may equal K+M. The original packets may carry non-overlapping (unique) data of the sequence data that is not carried by any other original packet, while each redundant packet may carry data of the sequence data that overlaps with data of one or more of the original packets and/or one or more of the other redundant packets.

Figure 12:
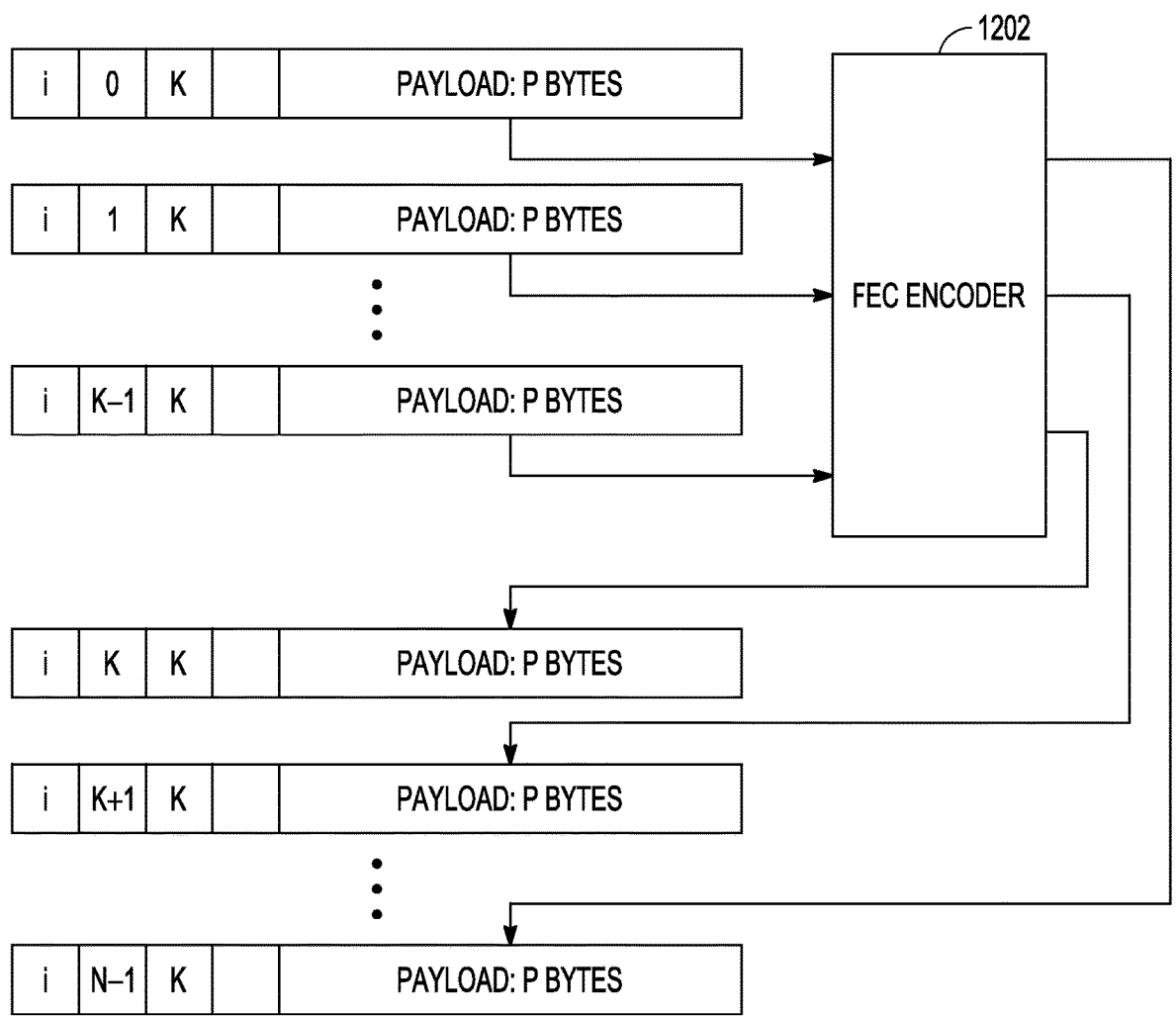
FIG. 12 illustrates encoding and redundant packets in accordance with some aspects.

After demultiplexing, forward error correction encoding may be performed by the CRS FEC encoder in the scheduler 914 of FIG. 9. Encoding and redundant packets are shown in FIG. 12, which also shows the CRS FEC encoder in the scheduler 914 as the encoder 1202. For each sequence, the encoder 1202 may take payload data of K blocks of length P (indexed as shown with sequence number i and block number 0 . . . . K-1) at the input, and output M parity check blocks of length P that should be "packed" the same way as before by adding sequence number, block number and padding headers. After encoding and packetization by the encoder 1202, N=K+M packets may result. Each packet may have P payload bytes and 8 header bytes. The total number of bytes may thus be P+8 bytes per packet.

The packets may then be scheduled. Each packet may be sent as a UDP packet to the remote side. In addition, it may be desirable to ensure every modem sends data at an average set rate. As above, the scheduling may employ different algorithms. In a first algorithm (algorithm 1): the best rate may be chosen to represent the "uncoded" rate. In this case, all other modems may represent a "redundant" rate by adding all of their rates. Let R[i] be a desired rate for modem i that was determined by the rate control. A data generation unit may initially generate the input data stream at the rate:

$\max(R[i])*$(time interval)$/R[i]$ is the bitrate of $i^{th}$ modem

The encoder rate may then be determined dependent on the ratio of "uncoded" rate and "redundant" rate; for example: a sequence of 4 packets, 3 modems, 3 rates R[3]=[100, 200, 400]. The best rate is R[2]=400, and the sum of all others becomes R[0]+R[1]=300. The ratio is 400:300 (that is 4:3), so an encoder rate=4/7 (=4/(4+3)) may be chosen to generate 3 redundant packets for 4 original packets. If integer redundant packets are unable to be generated, the redundant packets number may be dynamically adjusted to match the average encoder rate. In addition, an available modem may be chosen to send a packet—if a modem has sent enough packets, it may be skipped.

In a second algorithm (algorithm 2): a constant FEC rate K/N ratio (where K is the message length of the code, N is the total length of the code) may be used to generate redundant packets. The data generation unit may generate the input data stream at the rate:

$\text{sum}(R[i])*$(desired $FEC$ rate)$*$(time interval)$//R[i]$ is the bitrate of $i^{th}$ modem Because the FEC rate and the number of original packets is already known, redundant packets may be generated. For example, the FEC rate is 2/5, and the source sequence has been split into 2 packets. The redundant packets number is thus 3.

Figure 13:
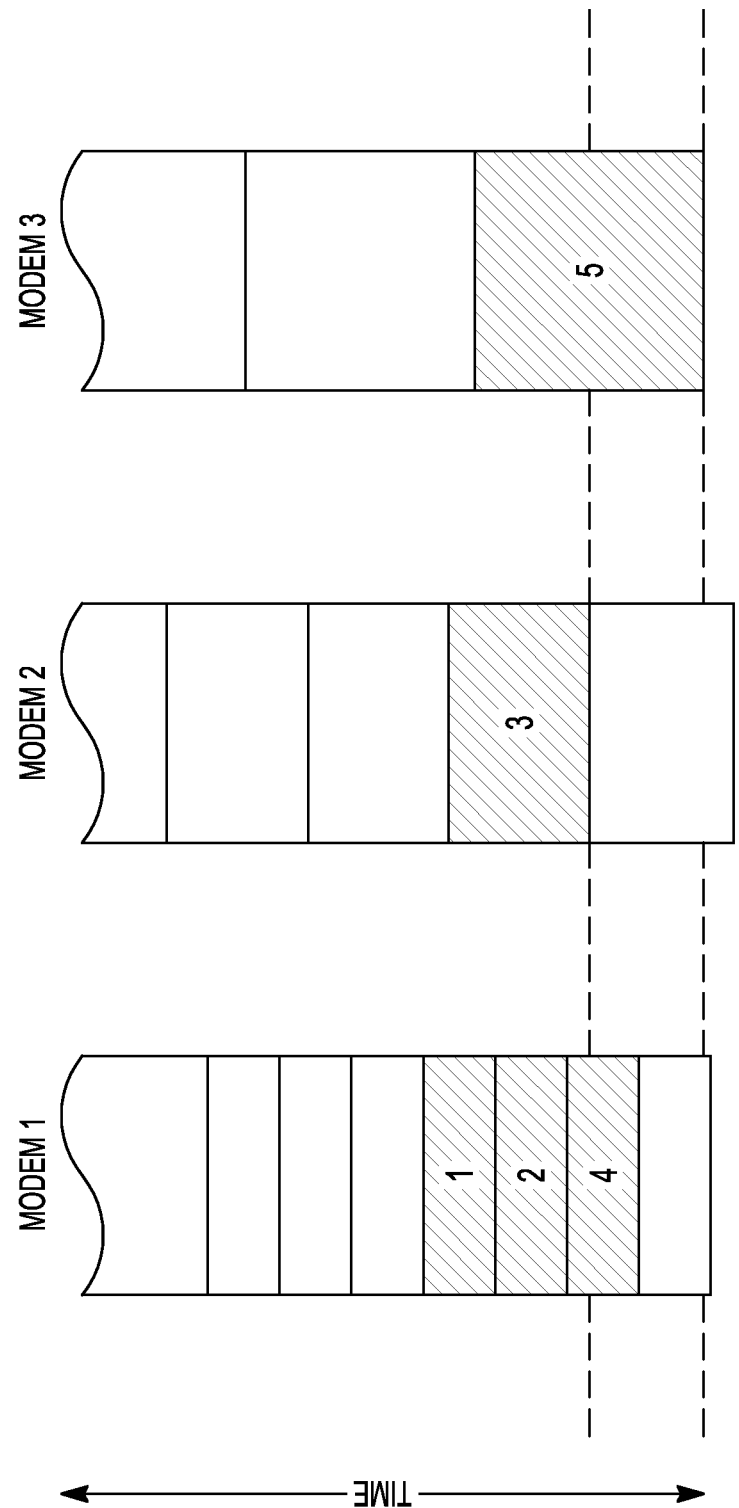
FIG. 13 illustrates an example of packet distribution in accordance with some aspects.

The modem rates and the free space in the modem input buffers are then used. Based on the modem information, when the modem will be "free" to get the next packet may be derived, and the next packet then sent out. For example, 5 packets are to be sent; the rate of modem 1>modem 2>modem 3. A modem may be chosen to minimize the end time of a packet, leaving the distribution to look like the packet distribution example shown in FIG. 13.

At the receiver, when a new packet is received, the sequence and block header may be determined. A matrix may then be used to store received packets. When a sufficient number of packets of a sequence has been received to start decoding, the other packets may be dropped from this sequence.

Figures 14A, 14B:
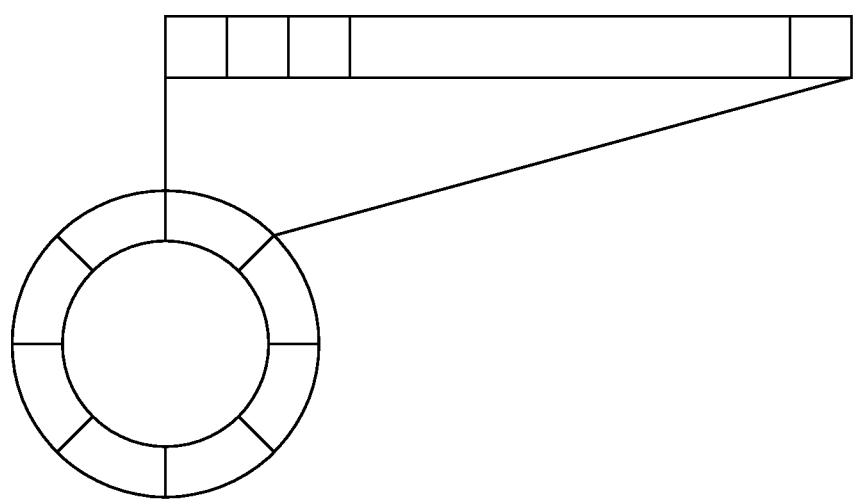
FIGS. 14(a) and 14(b) illustrate receive buffer structures in accordance with some aspects.

FIGS. 14(a) and 14(b) illustrate receive buffer structures in accordance with some aspects. In FIG. 14(a), each row represents a sequence, and each column in a row is a packet. Because the sequence ID is from 1~S and then restarted from 1 if the number exceeds S, the actual layout may look like a ring buffer, as shown in FIG. 14(b). In the ring buffer, each slot may represent a sequence, and some slots in the sequence may be used to store received packets.

Figure 15A:
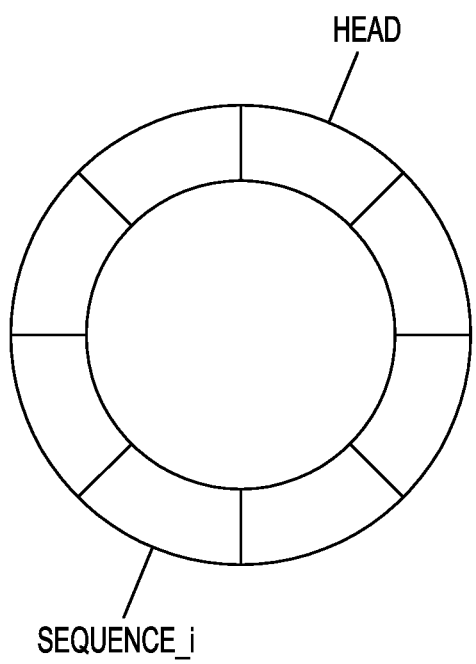
FIGS. 15(a) and 15(b) illustrate different cases in a distance check in a ring buffer in accordance with some aspects.
Figure 15B:
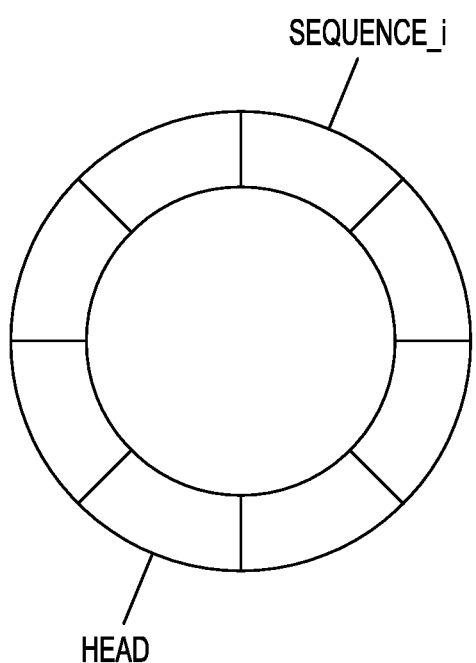

Occasionally, the sequence may be cleared to correctly process the next sequence with the same ID. To accommodate this, a head pointer may be used to indicate the next sequence that will be cleared or dropped. No matter whether the sequence is cleared or dropped, the information of the sequence may be set to a default value, the only difference may be whether the sequence has been decoded. The distance between sequence_i (the sequence of current received packet) and head pointer may be maintained to be smaller than a predetermined value (e.g., as shown 4/8 slots). If the distance is found to be not smaller than this value, the sequence may be cleared at the head pointer, then the head pointer moved to the next sequence and rechecked. Because the buffer is a ring buffer, there may be two cases. FIG. 15(*a*) and FIG. 15(*b*) illustrate different cases in a distance check in a ring buffer in accordance with some aspects.

When any K packets with the same sequence number are determined: if these K packets have block numbers from 0 to K-1 (i.e., they are the original message packets), backward multiplexing of the data block may be undertaken in accordance with the block numbers, the padding bits (if any) removed and the result returned as a result.

Figure 16:
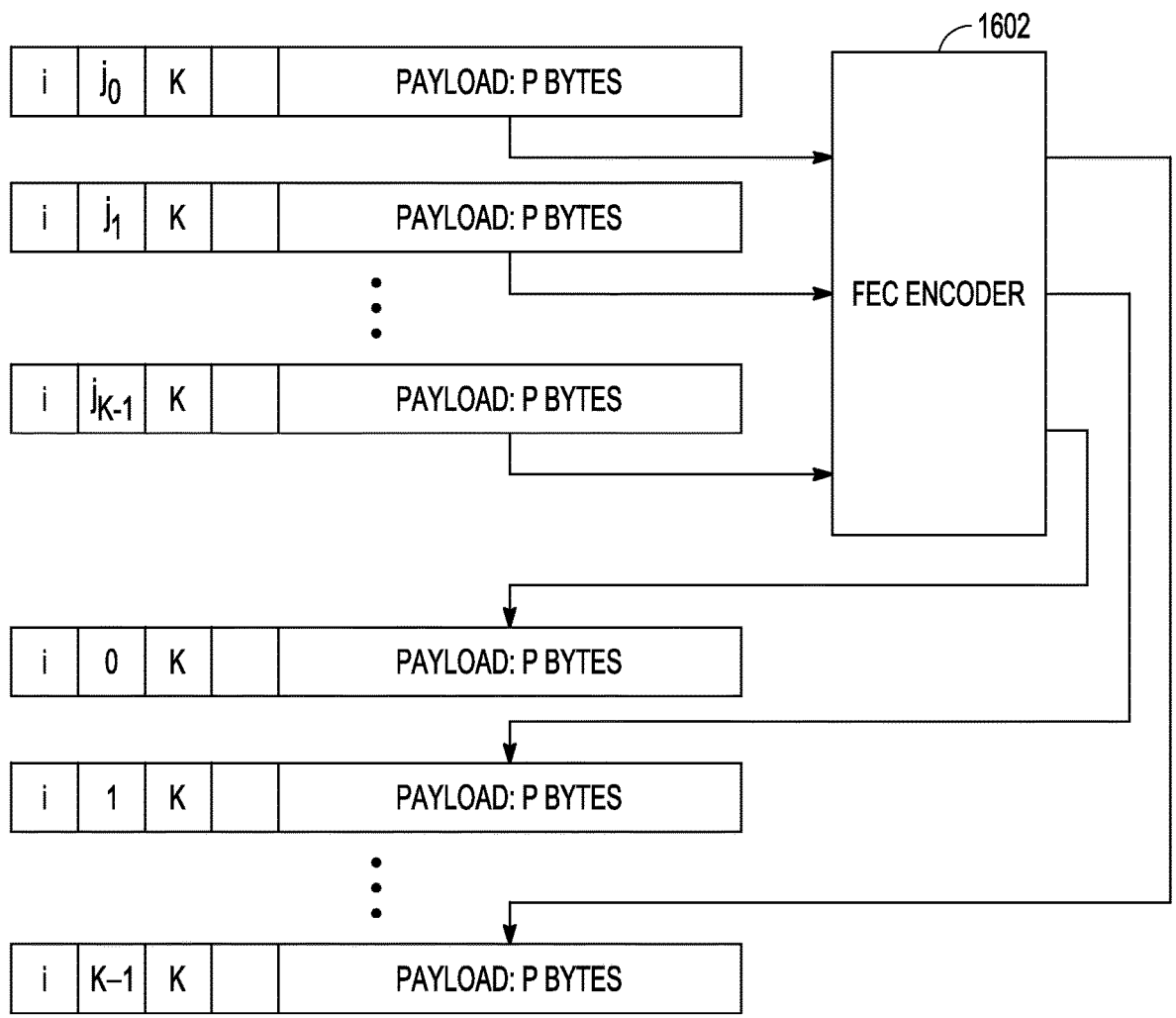
FIG. 16 illustrates decoding to reconstruct original K packets in accordance with some aspects.

Otherwise, an input may be formed for the FEC decoder by putting K existent blocks to their places, and all other places marked as "erasures". Subsequently, FEC decoding may be performed as shown in FIG. 16 to reconstruct original K message blocks. FIG. 16 illustrates decoding to reconstruct original K packets in accordance with some aspects. When the first K message blocks of the sequence i have been reconstructed (shown by index number $j_0$-$j_{k-1}$), backward multiplexing of the data block may be undertaken by the decoder 1602 in accordance with the block numbers. In this case, the padding bits (if any) may be removed and the resulting data may be returned as a result.

After decoding of the K packets has occurred, all resources related to sequence i may be released and all other packets that relate to sequence i may be dropped. As the sequence numbers may be reset at any time, reception of sequences with the same number may be prepared for. For example, after receiving of 10000 other sequences, the sequence with number i-10000 may appear again, but not earlier. So, all the packets related to sequence i may be dropped until a packet related to sequence (i+10000) mod2^16 is received.

Turning to rate control, one goal of rate control may be to limit the maximum data sending rate for each modem to ensure that the packets are not buffered before transmission in various buffers (such as in the IP stack buffer, MAC buffer, PHY aggregation buffers, etc). To ensure this, an array of desired rates may be determined for each modem and provided to the receiver side, e.g., over a control channel. At the transmitter side, data may always be counted before being sent to the modem so as not to exceed the desired rate. At the receiver side, every time a new packet is received from a given modem, the instant received data rate may be counted for a short time interval (for example, for the 16 last packets) for this modem and compared with the desired rate. If the actual measured rate is significantly lower than the desired rate (e.g., greater than about 10%-20% less), the desired rate may be decreased. If the actual rate is well aligned with the desired rate, an attempt to increase the desired rate may be made to check the network conditions, and remeasured after the round trip time. If the result does not change the actual measured rate, the previous desired rate may be used; if the new rate is OK, after a predetermined time the rate may again be increased. As the result, the network conditions may be continuously monitored and changes instantly reacted to.

In various aspects, the modems may communicate over the same communication standard or RAT (e.g., WiFi, Bluetooth, or cellular RATs such as 2G/3G/4G/LTE/5G) or may use different RATs. In addition, a mixture of both wireless and wired communication links may be used, rather than merely use of one type of communication link. In other aspects, one or more of the packets may be replicated and transmitted over multiple modems for redundancy, for example. The above technique may be used by not only UEs but in addition base stations, access points or other network equipment. The modems may be a dedicated physical device or may be a virtual unit, of which one or more can be housed in a physical unit, e.g. on a chip or board, or at the device level.

Thus, Cauchy Reed-Solomon (CRS) codes may be used for FEC (network layer coding, forward error correction) due to the speed and redundancy. Use of complex Raptor codes, LT-codes or Tornado codes for network layer may be avoided. In addition, the use of high rate codes for network layer FEC, for example, rate=0.9 or 0.95 may be avoided. Instead, lower rates such as 0.3 or 0.5 may be used. Rate control may be used to determine the rate for each channel by measuring instant receiving data rate. The rate control may have a very low granularity. The rate control used may operate at the same time as the real data is transmitted, i.e. the use of special training data (auxiliary packets to test the link) may be avoided. In addition, scheduling may be used to distribute FEC-encoded packets over multiple channels in accordance with the maximum rate determined by the rate control. The scheduler may predict the time of arrival for each packet using rate control data.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. A communication system comprising:
a transmitting device incorporated in a vehicle, the transmitting device comprising:
a plurality of modems configured to operate in parallel, each modem having an input buffer,
a demultiplexer configured to split a video slice into a plurality of packets, and
a scheduler configured to schedule data of the plurality of packets transmission by the modems over different channels at modem transmission rates, the modem transmission rate of each modem dependent on free space in the input buffer of the modem; and
a receiving device configured to reconstruct the video slice, the receiving device comprising a rate controller configured to provide rate control feedback to the transmitting device, the rate control feedback indicating an instant received data rate for each modem compared to the modem transmission rate, the scheduler further configured to adjust the modem transmission rates based on the rate control feedback,
wherein:
the video slice comprises a data frame having a sequence header and a sequence payload of a sequence,
the sequence payload comprises sequence data and a sequence identifier, the sequence identifier configured to identify the sequence, the sequence identifier incremented for each video slice and reset after reaching a maximum value,
the plurality of packets contains the sequence data, and
each of the packets comprises: the sequence identifier, a total number of blocks in the sequence, a block index that specifies a number of the packet in the sequence, the block index having a number less than the total number of blocks, and non-overlapping data of the sequence data, each block index specifying unique non-overlapping data of the sequence data.

2. The system of claim 1, wherein:
the transmitting device further comprises a forward error correction (FEC) encoder configured to receive the plurality of packets from the demultiplexor and generate redundant packets for transmission of the plurality of packets and the redundant packets by the modems, both the plurality of packets and the redundant packets encoded by the FEC encoder prior to transmission by the modems, and
the receiving device further comprises a FEC decoder configured to decode at least some of the encoded plurality of packets and redundant packets to reconstruct the video slice.

3. The system of claim 2, wherein:
the FEC encoder is further configured to use Cauchy Reed-Solomon (CRS) codes to generate the redundant packets, and
the FEC encoder is further configured to use a rate code of less than 0.5.

4. The system of claim 2, wherein:
the sequence header comprises a number of frame bytes of the data frame and a cyclic redundancy check (CRC).

5. The system of claim 4, wherein:
each of the plurality of packets is a same size.

6. The system of claim 5, wherein:
each redundant packet is the same size as each of the plurality of packets,
the redundant packets contain the sequence data, and
each of the redundant packets comprises:
the sequence identifier,
the total number of blocks in the sequence,
a redundant block index that specifies the number of the packet in the sequence, the redundant block index having a number equal to or greater than the total number of blocks, and
data of the sequence data that overlaps with the non-overlapping data of at least one of the plurality of packets.

7. The system of claim 6, wherein:
one of the modems has a higher transmission rate and remaining modems of the modems have a lower transmission rate,
the FEC encoder has an encoder rate that is a ratio of the higher transmission rate divided by a sum of the higher transmission rate and the lower transmission rates, and
a ratio of the plurality of packets to the redundant packets generated by the FEC encoder is a ratio of the higher transmission rate divided by a sum of the lower transmission rates.

8. The system of claim 7, wherein:
if the FEC encoder is unable to generate an integer number of redundant packets over a predetermined time period, the FEC encoder is further configured to dynamically adjust the number of redundant packets generated to match the encoder rate in average over multiple time periods.

9. The system of claim 7, wherein:
the scheduler is configured to select an available modem that has not exceeded the transmission rate for the available modem.

10. The system of claim 6, wherein:
the FEC encoder has an encoder rate that is a ratio of a message length of a code used for encoding divided by a total length of the code, and
a ratio of the plurality of packets to the redundant packets generated by the FEC encoder is a ratio of a number of the plurality of packets divided by a sum of the number of the plurality of packets and a number of redundant packets.

11. The system of claim 10, wherein:
the scheduler is configured to derive which modem will be available to receive a next packet based on the transmission rates of the modems and free space in input buffers of the modems and select a particular modem accordingly to avoid buffering the data to be transmitted by the modems.

12. The system of claim 6, wherein the receiving device is arranged to:
reconstruct the video slice using the sequence identifier and block index of received packets of the sequence by:
if a block index of each of the received packets is less than the total number of blocks, backward multiplexing the received packets in accordance with the block index of the received packets, and
if the block index of at least one of the received packets is equal to or greater than the total number of blocks:
arranging a first received set of the received packets having the sequence identifier in accordance with the block index of the first received set, a number of the first received set equaling the total number of blocks, and decoding the first received set using an FEC decoder and subsequently backward multiplexing packets from the FEC decoder in accordance with the block index, and release resources associated with the sequence after reconstruction of the video slice.

13. The system of claim 5, wherein the receiving device is arranged to:

reconstruct the video slice using the sequence identifier and block index of received packets of the sequence, store, in a buffer, a sufficient number of the received packets to start decoding using an FEC decoder, and after decoding has started, drop later-received packets having the sequence identifier.

14. The system of claim 13, wherein:

the buffer is a ring buffer having multiple slots, each slot representing a sequence having a different sequence index, and a head pointer is configured to indicate of the slots is a next slot to clear to permit storage of packets of a new sequence.

15. The system of claim 14, wherein:

adjacent received packets are able to have different sequence indexes, the head pointer is limited to he within a predetermined number of slots from a current slot associated with a currently received packet, and if the head pointer is not within the predetermined number of slots from the current slot, the head pointer clears the next slot and moves from the next slot to an adjacent slot of the next slot after the next slot is cleared.

16. The system of claim 1, wherein the receiving device is arranged to:

determine the instant received data rate for each modem by counting packets received from each modem over a predetermined time period, and for each modem:

if the instant received data rate is at least 10% lower than a desired data rate for the modem provided from the transmitting side, indicate to the transmitting side to lower the desired data rate, and if the instant received data rate is at most 10% lower than the desired data rate for the modem provided from the transmitting side:

indicate to the transmitting side to increase the desired data rate to a new desired data rate, measure a new instant received data rate after the desired data rate is increased, if the new instant received data rate is at most 10% lower than and at most 10% greater than the instant received data rate, indicate to the transmitting side to decrease the new desired data rate to the desired data rate; and if the new instant received data rate is at least 10% greater than the instant received data rate, attempt to increase the new instant received data rate after a predetermined amount of time.

17. A non-transitory computer-readable storage medium that stores instructions for execution by one or more processors of a communication device, the one or more processors to configure the communication device to, when the instructions are executed:

form uniform-sized original packets associated with a data frame, the data frame having a sequence header and a sequence payload, the sequence payload comprising a sequence identifier and sequence data, each of original packets comprising the sequence identifier, a total number of blocks in the sequence and includes the original packets and redundant packets, a block index that specifies an order of the packet in the sequence, and a unique portion of the sequence data, the block index for the original packets less than a number of the original packets;

encode the original packets to form the redundant packets, each of original packets comprising the sequence identifier, the total number of blocks in the sequence, the block index, and a redundant portion of the sequence data, the block index for the redundant packets at least the number of the original packets; and schedule transmission of the original and redundant packets transmission by individual modems over different channels at modem transmission rates, each modem transmission rate configured to minimize free space in an input buffer of the modem and dependent on rate control feedback indicating a difference between the modem transmission rate and a packet reception rate at a receiving device, wherein an encoding rate is dependent either on a ratio of a number of the original packets to a sum of the number of the original packets and a number of the redundant packets or a ratio of a maximum modem transmission rate to a sum of remaining modem transmission rates.

18. The non-transitory computer-readable storage medium of claim 17, wherein the one or more processors further configure the communication device to, when the instructions are executed:

if the encoding is unable to generate an integer number of redundant packets over a predetermined time period, dynamically adjust the number of redundant packets generated to match an encoder rate in average over multiple time periods.

19. A method of reducing transmission time in a communication system, the method comprising:

forming uniform-sized original packets associated with a data frame, the data frame having a sequence header and a sequence payload, the sequence payload comprising a sequence identifier and sequence data, each of original packets comprising the sequence identifier, a total number of blocks in the sequence and includes the original packets and redundant packets, a block index that specifies an order of the packet in the sequence, and a unique portion of the sequence data, the block index for the original packets less than a number of the original packets;

encoding the original packets to form the redundant packets, each of original packets comprising the sequence identifier, the total number of blocks in the sequence, the block index, and a redundant portion of the sequence data, the block index for the redundant packets at least the number of the original packets; and scheduling transmission of the original and redundant packets by individual modems over different channels at modem transmission rates, each modem transmission rate configured to minimize free space in an input buffer of the modem and dependent on rate control feedback indicating a difference between the modem transmission rate and a packet reception rate at a receiving device, wherein an encoding rate is dependent either on a ratio of a number of the original packets to a sum of the number of the original packets and a number of the redundant packets or a ratio of a maximum modem transmission rate to a sum of remaining modem transmission rates.

20. The method of claim 19, further comprising:
if the encoding is unable to generate an integer number of redundant packets over a predetermined time period, dynamically adjusting the number of redundant packets generated to match an encoder rate in average over multiple time periods.

* * * * *

UNITED STATES PATENT AND TRADEMARK OFFICE
CERTIFICATE OF CORRECTION

PATENT NO. : 10,958,587 B2  
APPLICATION NO. : 16/370475  
DATED : March 23, 2021  
INVENTOR(S) : Belogolovy et al.

Page 1 of 1

It is certified that error appears in the above-identified patent and that said Letters Patent is hereby corrected as shown below:

In the Claims

In Column 27, Line 11, in Claim 1, delete "demultiplexer" and insert --demultiplexor-- therefor In Column 27, Lines 15-16, in Claim 1, delete "modern" and insert --modem-- therefor In Column 28, Line 36, in Claim 9, delete "modern." and insert --modem.-- therefor In Column 29, Line 19, in Claim 14, after "indicate", insert --which--

In Column 29, Line 25, in Claim 15, delete "he" and insert --be-- therefor

In Column 29, Line 35, in Claim 16, delete "modern" and insert --modem-- therefor In Column 29, Line 50, in Claim 16, after "rate,", delete a linebreak In Column 29, Line 52, in Claim 16, delete "rate;" and insert --rate,-- therefor In Column 30, Line 24, in Claim 17, delete "modern" and insert --modem-- therefor Signed and Sealed this  
Sixth Day of July, 2021

Drew Hirshfeld  
*Performing the Functions and Duties of the  
Under Secretary of Commerce for Intellectual Property and  
Director of the United States Patent and Trademark Office*